United States Patent [19]

McIntyre et al.

[11] Patent Number: 4,882,211

[45] Date of Patent: Nov. 21, 1989

[54] PAPER PRODUCTS WITH RECEPTIVE COATING FOR REPOSITIONABLE ADHESIVE AND METHODS OF MAKING THE PRODUCTS

[75] Inventors: Timothy J. McIntyre, Florissant, Mo.; Walter G. Greig, Lewiston, N.Y.

[73] Assignee: Moore Business Forms, Inc., Grand Island, N.Y.

[21] Appl. No.: 227,552

[22] Filed: Aug. 3, 1988

[51] Int. Cl.[4] .......................... B32B 7/06; B32B 7/10; B32B 7/12; B32B 7/14

[52] U.S. Cl. ...................................... 428/40; 428/194; 428/343; 428/354; 503/206; 281/15 R

[58] Field of Search ................. 428/40, 194, 343, 355, 428/354; 503/206; 281/15 R

[56] References Cited

U.S. PATENT DOCUMENTS

| | | |
|---|---|---|
| 2,000,763 | 5/1935 | Lane . |
| 2,096,351 | 10/1937 | Semonson . |
| 2,173,972 | 9/1939 | Lane . |
| 2,173,989 | 9/1939 | Wilbur . |
| 3,723,156 | 3/1973 | Brockett et al. . |
| 3,732,120 | 5/1973 | Brockett et al. . |
| 3,839,070 | 10/1974 | Jablonski et al. . |
| 4,093,278 | 6/1978 | Sears . |
| 4,113,282 | 9/1978 | Spatz et al. . |
| 4,137,084 | 1/1979 | Davis et al. . |
| 4,138,508 | 2/1979 | Spatz et al. . |
| 4,165,102 | 8/1979 | Bodmer . |
| 4,165,103 | 8/1979 | Bodmer . |
| 4,166,644 | 9/1979 | Kay et al. . |
| 4,186,115 | 1/1980 | Spatz et al. . |
| 4,188,456 | 2/1980 | Patel . |
| 4,219,220 | 8/1980 | Oda et al. . |
| 4,226,962 | 10/1980 | Stolfo . |
| 4,268,567 | 5/1981 | Harmony . |
| 4,400,492 | 8/1983 | Asano et al. . |
| 4,540,998 | 9/1985 | Bodmer et al. . |
| 4,578,136 | 3/1986 | Brown . |
| 4,610,727 | 9/1986 | Bodmer et al. . |
| 4,652,486 | 3/1987 | Tasaka et al. . |

*Primary Examiner*—Alexander S. Thomas
*Attorney, Agent, or Firm*—Nixon & Vanderhye

[57] ABSTRACT

Supply paper is provided at spaced longitudinal positions along one side with a repositionable adhesive. A receptive coating comprised of a CF oil-based ink is applied at spaced longitudinal positions along the opposite of the paper, the positions along opposite sides of the paper being out of registration one with the other. The paper is cut into strips, assembled to form pads with the repositionable adhesive holding the paper strips one to the other at one end thereof. A paper strip may be removed from the pad and flexed to form a band with opposite ends overlying one another with the adhesive in contact with the receptive coating. The repositionable adhesive and receptive coating cooperate to provide enhanced adhesion.

9 Claims, 2 Drawing Sheets

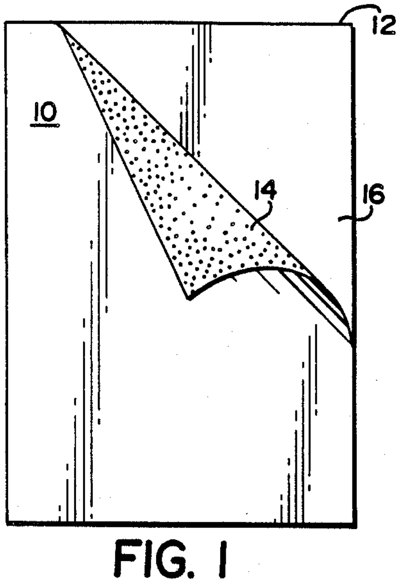
FIG. 1
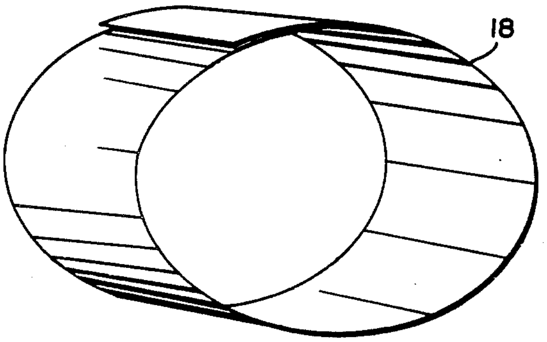
FIG. 3
FIG. 2
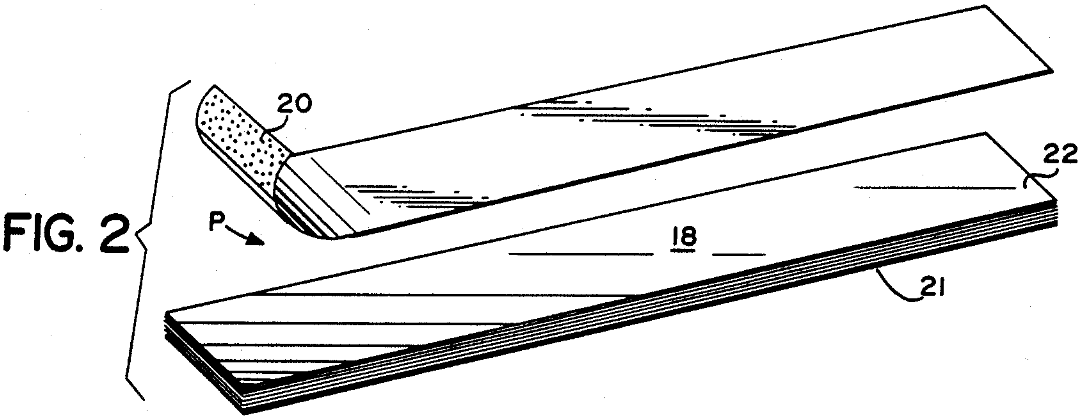

PAPER PRODUCTS WITH RECEPTIVE COATING FOR REPOSITIONABLE ADHESIVE AND METHODS OF MAKING THE PRODUCTS

BACKGROUND OF THE INVENTION

The present invention relates to various types of paper products having a receptive coating for contact with a repositionable adhesive to provide enhanced adhesion and methods of making such paper products.

Many paper products have been formed with permanent adhesive applied to a portion thereof for permanently adhering that portion to another paper portion, whether it be the same sheet or another sheet. That type of adhesive is well known for its substantial strength and frequently the paper must be torn before the adhesively-secured paper portions may be separated. In more recent years, repositionable adhesive has been developed. In one application, repositionable adhesive is applied to individual sheets or notes adjacent margins at one end thereof, with the sheets or notes provided in pad form and held together solely by the repositionable adhesive. The individual sheets may be readily removed from the underlying sheet and the removed sheet repositioned with the adhesive adhered to another surface. The tack of repositionable adhesives is thus somewhat reduced from that of the more permanent-type adhesives.

Many additional applications have been developed using repositionable adhesive. However, the reduced tack or adhesive power of repositionable adhesive as compared with permanent type adhesives causes certain problems. For example, from the standpoint of its adhesion quality, there are a number of applications where it would be desirable to use repositionable adhesive but for its lack of substantial tack or adhesive holding power. Consequently, it is desirable in a substantial number of applications to enhance the adhesive power of repositionable adhesive such that it remains readily removable from its pre-use form, i.e., a pad, yet has enhanced adhesive qualities when put to final use.

SUMMARY OF THE INVENTION

According to the present invention, it has been discovered that the adhesion properties of repositionable adhesive, when contacted with a portion of the same or another sheet having a receptive coating, can be substantially enhanced beyond the adhesive properties of repositionable adhesive when contacted with a non-receptive coated surface. That is, according to the present invention, repositionable adhesive in contact with a receptive coating provides enhanced tack and greater adhesion. For example, repositionable adhesive may be applied to a portion of a sheet of paper. A receptive coating may be applied to a portion of the same or another sheet of paper. Preferably, the receptive coating is a CF ink. When adhesive and receptive coated portions of the paper(s) are contacted one with the other, it has been discovered that the paper portions are adhesively secured one to the other in a manner exhibiting enhanced adhesive properties and tack. In this manner, a more secure adhesive joint using repositionable adhesive is obtained in comparison with using repositionable adhesive for joining sheets without a receptive coating.

As a further example of the foregoing, and in accordance with the present invention, strips of paper may be provided with repositionable adhesive applied along a margin adjacent one end of each strip and along its underside whereby the plurality of strips of paper may be adhered one to the other in pad form. The repositionable adhesive, of course, permits the removal of the strips of paper for repositioning on other surfaces, with the repositionable adhesive adhering the paper to such other surface. The margin of the strip at its opposite end and on the side of the strip opposite the repositionable adhesive, may be provided with the receptive coating. Thus, by applying CF ink to the opposite end and the upper side of each paper strip of the pad, the strips may be removed individually from the pad and opposite ends joined one to the other with the repositionable adhesive in contact with the receptive coating to form a binder, for example, a money wrap. The repositionable adhesive cooperates with the receptive coating to provide greater adhesion and enhanced tack as compared with contacting repositionable adhesive to a non-receptive coating portion of the strip.

In accordance with a preferred embodiment of the present invention, there is provided a pad comprising multiple sheets of material and means adjacent one end of each sheet for releasably securing the sheets one to the other to form the pad including repositionable adhesive applied on one side of each sheet adjacent one end thereof. A receptive coating is applied on the opposite side of each sheet adjacent the opposite end thereof. Thus, upon removal of the individual sheets from the pad, each sheet may be flexed to locate its opposite ends in overlying relation with one another and with the repositionable adhesive and receptive coating in contact one with the other thereby adhesively securing the opposite ends together.

In a further preferred embodiment in accordance with the present invention, there is provided a strip of sheet material comprising a repositionable adhesive applied on one side of the sheet adjacent one end thereof. A receptive coating is applied on the opposite side of the sheet adjacent the opposite end thereof such that the sheet may be flexed to locate its opposite ends in overlying relation one with the other and with the adhesive and receptive coating contacting one another, thereby adhesively securing the opposite ends together. The adhesive and receptive coating are cooperable with one another to form an adhesive connection between the opposite sheet ends stronger than an adhesive connection using solely repositionable adhesive in contact with a surface without the receptive coating.

In a still further preferred embodiment in accordance with the present invention, there is provided a paper product comprising a first paper sheet having repositionable adhesive applied at least on a portion of one side of the sheet. A second paper sheet is provided having a receptive coating applied on at least a portion of one side thereof such that the sheets may overlie one another with the adhesive and receptive coating portions contacting one another. The sheet portions are consequently adhesively secured one to the other, the adhesive and receptive coating being cooperable with one another to form an adhesive connection between the contacting sheet portions stronger than an adhesive connection using solely repositionable adhesive in contact with a surface without the receptive coating.

In accordance with a further aspect of the present invention, there is provided a method of forming a paper product from a supply roll of paper comprising the steps of applying a repositionable adhesive on at least a portion of one side of the paper supplied from the supply roll, applying a receptive coating on at least a portion of the other side of the paper supplied from the supply roll mating the adhesive and receptive coating and then cutting the paper to form the paper product.

Accordingly, it is a primary object of the present invention to provide novel and improved adhesive structures using repositionable adhesive on one of the adhesively secured elements in contact with a receptive coating on the other of the adhesively secured elements wherein the tack or adhesive property of the repositionable adhesive is enhanced by its mating engagement with the receptive coating and methods of making such structures.

These and further objects and advantages of the present invention will become more apparent upon reference to the following specification, appended claims and drawings.

BRIEF DESCRIPTION OF THE DRAWING FIGURES

FIG. 1 is a front perspective view of two sheets, preferably paper, adhered one to the other using a repositionable adhesive and receptive coating in accordance with the present invention;

FIG. 2 is a perspective view of another embodiment of the present invention illustrating a pad of paper strips employing the repositionable adhesive and receptive coating of the present invention;

FIG. 3 is a perspective view of a single paper strip of the pad of FIG. 2 with its opposite ends joined one to the other to form a continuous band.

DETAILED DESCRIPTION OF THE DRAWING FIGURES

Figure 4:
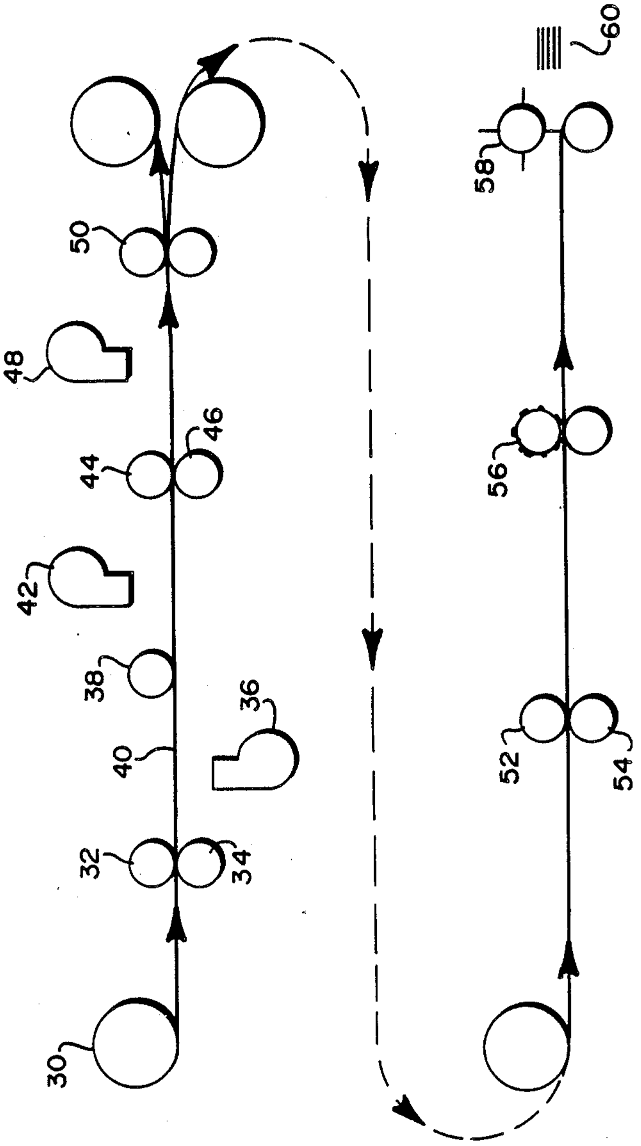
FIG. 4 is a schematic drawing illustrating a method of manufacturing the paper strip illustrated in FIG. 3.

Reference will now be made in detail to the present preferred embodiment of the invention, an example of which is illustrated in the accompanying drawings.

Referring now to FIG. 1, there is illustrated two sheets, 10 and 12, respectively, of material, preferably paper, adhered one to the other by the contacting a repositionable adhesive applied to one sheet, i.e., sheet 10, and a receptive coating applied to the other sheet, i.e., sheet 12, one with the other in accordance with the present invention. More particularly, repositionable adhesive 14 is adhered to the underside of sheet 10. The repositionable adhesive 14 may be of the type used by Moore Business Forms, Inc., identified as Note Stix TM, but may be any conventional type of repositionable adhesive. A receptive coating 16 is applied to the upper surface of the underlying sheet 12 for contact with the repositionable adhesive 14 when the two sheets 10 and 12 are adhered one to the other. A receptive coating according to the present invention may comprise any type of coating to a paper product which, when contacted by a repositionable adhesive applied to the same or another paper, enhances the tack and adhesion quality of the repositionable adhesive and thus strengthens the adhesive joint beyond the strength of such joint using repositionable adhesive without contacting a receptive coating. In a preferred embodiment hereof, the receptive coating may comprise a CF type ink, such as set forth in U.S. Pat. Nos. 4,165,102; 4,165,103; 4,166,644; and 4,188,456. While the CF inks of these patents are water-based, preferably an oil-based CF ink is employed herein. While CF inks per se are known and have been used in the printing industry, it has been discovered, according to the present invention, what the tack or adhesive holding power of repositionable adhesive in contact with a receptive coating comprised of CF ink is substantially improved. Consequently, with sheets 10 and 12 adhered one to the other and the repositionable adhesive in contact with the CF ink coating, increased resistance to separation is obtained. It will of course be appreciated that the repositionable adhesive and receptive coating may be applied to the entirety or to just portions of sheets 10 and 12, respectively, as desired.

Referring now to FIG. 2, there is illustrated an example of a paper product of the present invention used to form bands or wrappers, for example, shirt bands or money wrappers. In FIG. 2, a pad P of sheet material, preferably paper is provided, in the form of a plurality of strips of paper releasably secured one to the other adjacent one end. For example, the strips of paper are releasably secured one to the other similarly as the notes of commercial note pads are releasably secured one to the other to form a pad for individual removal and adhesion to other surfaces. More particularly, the pad includes a plurality of strips 18 having adjacent one end thereof repositionable adhesive 20 applied to the underside of the strip for adhering the strip to the underlying strip 18. Thus, a plurality of strips 18 are releasably secured one to the other by means of the repositionable adhesive 20 applied to the underside of each strip 18 adjacent an end thereof for adhering that strip to the upper surface of the underlying strip at the like end of the pad. A backing strip 21 is provided as the undersurface of the pad. A release coating on surface 18 may be necessary for satisfactory removal.

At the opposite end of the pad P, a receptive coating 22 is applied adjacent the end margin but on the opposite side of the strip from the side on which the repositionable adhesive is applied. The receptive coating, preferably a CF oil-based ink, has no adhesive qualities per se and, consequently, the ends of the paper strips opposite the ends bearing the repositionable adhesive are not adhered to and are relatively free from one another. When the individual strips are removed from the pad, each strip may be folded or flexed over, as illustrated in FIG. 3, such that the portions of the strips bearing the repositionable adhesive and the receptive coating can be placed in contact one with the other whereby opposite ends of the strips are adhesively secured one to the other. As noted previously, the repositionable adhesive interacts with the receptive coating to enhance the strength of the adhesive joint between the opposite ends of the strip.

Referring now to FIG. 4, there is illustrated a method of forming the strips with the repositionable adhesive and receptive coating illustrated in FIGS. 2 and 3. Particularly, a supply roll 30 of sheet material, preferably paper, in a width which is a multiple of the width of the final strip of paper, supplies paper between a first pair of rollers 32. The lower roller 34 applies a coating, for example, a water repellent and release agent for hydrophilic surfaces, to the underside of the paper. This coating may be of the type sold under the tradename Quilon ® and the curing of the coating on the underside of the paper is enhanced by a dryer 36. Subsequent to dryer 36, there is provided a tie coat applying station, including a roller 38, for applying the tie coat along the supply strip 40. The tie coat is cured on the supply strip 40 by a dryer 42. The supply strip with the water repellent and release coating along its underside and tie coat along its upper side are passed between a pair of rolls 44 and 46. The upper roll 44 of the pair of rolls 44 and 46 applies the repositional adhesive at spaced longitudinal locations along the supply strip. A subsequent dryer 48 cures the repositional adhesive on the strip. A slitter is provided at station 50 for slitting supply stock 40 into widths corresponding to the width of the strips to be formed and supplied in the form of the pad, for example, as illustrated in FIG. 2.

The longitudinally-slit supply stock is inverted and then passed between a pair of rolls 52 and 54. Upper roll 52 applies the receptive coating, i.e., the oil-based CF ink, at periodic intervals along the upper surface of the supply stock after the stock has been inverted, i.e., to the surface of the strip opposite the adhesive. Particularly, the receptive coating is applied to the upper surface in areas out of alignment or registry with the repositionable adhesive applied to the opposite side of the stock but closely adjacent thereto so that the stock may be appropriately cut into strips. The next station is a print station, where printing, as desired, may be provided on the upper surface, i.e., the surface coated with the water repellent and release agent Quilon®. The completed stock is then passed through a slitter station 58 at which the stock is cut into the appropriate lengths or strips along a transverse line of demarcation between the underlying repositionable adhesive and the overlying receptive coating. The individual strips are then disposed in pad form by conventional means and this is schematically represented at 60.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pad comprising multiple sheets of material;

means adjacent one end of each sheet for releasably securing said sheets one to the other to form said pad including repositionable adhesive applied on one side of each sheet adjacent said one end thereof; and a receptive coating applied on the opposite side of each sheet adjacent the opposite end thereof such that, upon removal of the individual sheets from the pad, each sheet may be flexed to locate its opposite ends in overlying relation with one another and with said adhesive and said receptive coating in contact one with the other thereby adhesively securing said opposite ends together.

2. A pad according to claim 1 wherein said repositionable adhesive constitutes the sole securement of said sheets to one another and to said pad thereof.

3. A pad according to claim 1 wherein said adhesive and said receptive coating cooperate with one another to form an adhesive connection between the opposite sheet ends stronger than an adhesive connection using solely said repositionable adhesive without said receptive coating.

4. A pad according to claim 1 wherein said pad includes a backing sheet underlying all the sheets in said pad.

5. A pad according to claim 1 wherein said receptive coating is comprised of an oil based CF ink.

6. A pad according to claim 5 wherein said repositionable adhesive constitutes the sole securement of said sheets to one another and to said pad thereof, said adhesive and said receptive coating cooperating one with the other to form an adhesive connection between the opposite sheet ends stronger than an adhesive connection using solely said repositionable adhesive without said receptive coating.

7. A strip of sheet material, comprising:

a repositionable adhesive applied on one side of said sheet adjacent one end thereof; and a receptive coating applied on the opposite side of said sheet adjacent the opposite end thereof such that said sheet may be flexed to locate its opposite ends in overlying relation one with the other and with said adhesive and said receptive coating contacting one another thereby adhesively securing said opposite ends together, said adhesive and said receptive coating being cooperable with one another to form an adhesive connection between the opposite sheet ends stronger than an adhesive connection using solely said repositionable adhesive in contact with sheet material without said receptive coating.

8. A strip according to claim 7 wherein said receptive coating is comprised of a CF oil based ink.

9. A strip according to claim 7 wherein said strip is elongated and said adhesive and said receptive coating are applied to the opposite ends of said strip.

* * * * *